(12) United States Patent
Schmalz

(10) Patent No.: US 9,803,584 B2
(45) Date of Patent: Oct. 31, 2017

(54) COMBINED HEAT AND POWER SYSTEM

(71) Applicant: Briggs & Stratton Corporation, Wauwatosa, WI (US)

(72) Inventor: Jacob J. Schmalz, Milwaukee, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 27 days.

(21) Appl. No.: 15/089,240

(22) Filed: Apr. 1, 2016

(65) Prior Publication Data

US 2016/0290281 A1    Oct. 6, 2016

Related U.S. Application Data

(60) Provisional application No. 62/141,655, filed on Apr. 1, 2015, provisional application No. 62/279,464, filed on Jan. 15, 2016.

(51) Int. Cl.
| | |
|---|---|
| *F02B 63/04* | (2006.01) |
| *H02K 7/18* | (2006.01) |
| *F02G 5/02* | (2006.01) |
| *F02B 43/02* | (2006.01) |
| *B60L 1/02* | (2006.01) |
| *F02B 43/10* | (2006.01) |

(52) U.S. Cl.
CPC .............. *F02G 5/02* (2013.01); *F02B 43/02* (2013.01); *F02B 63/04* (2013.01); *F02B 2043/103* (2013.01); *Y02E 20/14* (2013.01); *Y02E 20/16* (2013.01); *Y02T 10/166* (2013.01)

(58) Field of Classification Search
USPC ...................................................... 290/1 A, 2
See application file for complete search history.

(56) References Cited

U.S. PATENT DOCUMENTS

| | | | |
|---|---|---|---|
| 4,736,111 A | | 4/1988 | Linden |
| 5,382,833 A | * | 1/1995 | Wirges ............. F01P 5/10 123/41.44 |

(Continued)

FOREIGN PATENT DOCUMENTS

| | | |
|---|---|---|
| EP | 1 669 685 A2 | 6/2006 |
| EP | 1 884 727 A2 | 2/2008 |
| WO | WO-99/40310 | 8/1999 |

*Primary Examiner* — Pedro J Cuevas
(74) *Attorney, Agent, or Firm* — Foley & Lardner LLP

(57) ABSTRACT

A combined heat and power system includes a liquid-cooled internal combustion engine, an air-cooled alternator, an air-to-water heat exchanger, and a coolant-to water heat exchanger. The liquid-cooled internal combustion engine includes a liquid cooling system configured to cool the engine with coolant thereby heating the coolant. The air-cooled alternator is configured to be driven by the internal combustion engine to produce electricity. The alternator includes an air cooling system configured to cool the alternator thereby heating air. The air-to-water heat exchanger is configured to place heated air and water in a heat exchange relationship to preheat the water and cool the air. The coolant-to-water heat exchanger is configured to place heated coolant and preheated water from the air-to-water heat exchanger in a heat exchange relationship to further heat the water and cool the coolant. The coolant-to-water heat exchanger provides heated water to the housing water outlet.

20 Claims, 7 Drawing Sheets

(56) References Cited

U.S. PATENT DOCUMENTS

| | | | | |
|---|---|---|---|---|
| 6,155,042 A * | 12/2000 | Perset | | F01N 3/043 123/568.12 |
| 6,312,842 B1 * | 11/2001 | Reiser | | H01M 8/04029 429/437 |
| 6,543,531 B1 * | 4/2003 | Casar | | B60H 1/00907 165/202 |
| 6,823,291 B2 | 11/2004 | Marsland | | |
| 6,913,068 B2 | 7/2005 | Togawa et al. | | |
| 7,201,225 B2 * | 4/2007 | Smith | | B01D 17/044 166/250.01 |
| 7,290,592 B2 * | 11/2007 | Larson | | F02B 29/0431 165/41 |
| 7,424,916 B2 * | 9/2008 | Foster | | E21B 37/00 166/303 |
| 7,458,417 B2 * | 12/2008 | Larson | | F02B 29/0431 123/41.01 |
| 7,466,034 B2 | 12/2008 | Kang et al. | | |
| 7,481,071 B2 | 1/2009 | Choi et al. | | |
| 7,546,874 B2 * | 6/2009 | Smith | | E21B 21/063 166/267 |
| 7,637,232 B2 * | 12/2009 | Foster | | F22B 1/1807 122/26 |
| 7,675,187 B2 | 3/2010 | Woods et al. | | |
| 7,969,030 B2 | 6/2011 | Woods et al. | | |
| 8,222,756 B2 | 7/2012 | Koeneman et al. | | |
| 8,371,251 B2 * | 2/2013 | Frick | | F01K 27/02 122/406.1 |
| 8,387,570 B2 * | 3/2013 | Firey | | F02B 45/08 123/23 |
| 8,492,913 B2 | 7/2013 | Koeneman et al. | | |
| 8,550,038 B2 * | 10/2013 | Marlenee | | H02P 9/04 123/41.01 |
| 8,793,986 B2 * | 8/2014 | Caine | | B60H 1/025 123/568.12 |
| 8,829,698 B2 | 9/2014 | Koeneman et al. | | |
| 8,881,694 B2 * | 11/2014 | Gillett | | H02K 5/20 123/41.1 |
| 9,347,303 B2 * | 5/2016 | Horst | | E21B 43/34 |
| 9,469,552 B2 * | 10/2016 | Horst | | E21B 43/34 |
| 2003/0205360 A1 * | 11/2003 | Larson | | F02B 29/0431 165/43 |
| 2006/0137923 A1 * | 6/2006 | Larson | | F02B 29/0431 180/65.28 |
| 2009/0211253 A1 * | 8/2009 | Radcliff | | F01K 23/065 60/670 |
| 2010/0147233 A1 * | 6/2010 | Firey | | F02B 45/08 123/23 |
| 2010/0154395 A1 * | 6/2010 | Frick | | F01K 27/02 60/320 |
| 2010/0281901 A1 * | 11/2010 | Kawase | | B60H 1/00885 62/238.7 |
| 2011/0005757 A1 * | 1/2011 | Hebert | | E21B 36/006 166/302 |
| 2011/0011069 A1 | 1/2011 | Umeno | | |
| 2011/0248511 A1 * | 10/2011 | Marlenee | | H02P 9/04 290/1 A |
| 2012/0048717 A1 * | 3/2012 | Frick | | F01K 27/02 203/22 |
| 2012/0180452 A1 * | 7/2012 | Caine | | B60H 1/025 60/273 |
| 2012/0255916 A1 * | 10/2012 | Horst | | E21B 43/34 210/774 |
| 2013/0075245 A1 * | 3/2013 | Frick | | B01D 1/0047 203/22 |
| 2013/0125842 A1 * | 5/2013 | Frick | | F22B 1/00 122/7 R |
| 2013/0147203 A1 * | 6/2013 | Gillett | | F02B 63/044 290/1 A |
| 2013/0200012 A1 * | 8/2013 | Holmes | | B01D 29/114 210/804 |
| 2014/0021032 A1 * | 1/2014 | Frick | | B01D 1/0047 203/12 |
| 2014/0021033 A1 * | 1/2014 | Frick | | B01D 3/007 203/12 |
| 2014/0223933 A1 * | 8/2014 | Steele | | F25B 25/005 62/98 |
| 2014/0263681 A1 * | 9/2014 | Bell | | F02G 5/00 237/12.1 |
| 2014/0305386 A1 | 10/2014 | Nagasato et al. | | |
| 2015/0308326 A1 * | 10/2015 | Davies | | F01P 11/029 137/2 |
| 2016/0237884 A1 * | 8/2016 | Yamada | | F02B 37/186 |
| 2016/0290280 A1 * | 10/2016 | Blankenship | | F02G 5/02 |
| 2016/0290281 A1 * | 10/2016 | Schmalz | | F02G 5/02 |
| 2017/0065904 A9 * | 3/2017 | Frick | | B01D 1/0047 |

* cited by examiner

COMBINED HEAT AND POWER SYSTEM

CROSS-REFERENCE TO RELATED PATENT APPLICATIONS

This application claims the benefit of U.S. Application No. 62/279,464, filed Jan. 15, 2016 and the benefit of U.S. Application No. 62/141,655, filed Apr. 1, 2015, both of which are incorporated herein by reference in their entireties.

BACKGROUND OF THE INVENTION

The present invention relates to the field of combined heat and power ("CHP") systems, also known as cogeneration systems.

SUMMARY OF THE INVENTION

One embodiment of the invention relates to a combined heat and power system including a housing, a coolant circuit, a liquid-cooled internal combustion engine, an air-cooled alternator, a water circuit, an air-to-water heat exchanger, a coolant-to water heat exchanger, and an exhaust-to-coolant heat exchanger. The housing includes a first chamber, a second chamber, and a passageway fluidly coupling the first chamber to the second chamber. The coolant circuit includes a coolant pump configured to pump coolant through the coolant circuit. The liquid-cooled internal combustion engine includes an exhaust outlet configured to output exhaust at a first exhaust temperature and a liquid cooling system with an engine coolant inlet configured to receive coolant at a first coolant temperature from a first portion of the coolant circuit and an engine coolant outlet configured to output coolant at a second coolant temperature greater than the first coolant temperature to a second portion of the coolant circuit. The engine is located in the first chamber. The liquid cooling system is configured to cool the engine thereby heating the coolant. The air-cooled alternator is configured to be driven by the internal combustion engine to produce electricity. The alternator includes an air cooling system with an alternator air inlet configured to receive air from the second chamber at a first air temperature and an alternator air outlet configured to output air at a second air temperature greater than the first air temperature to the first chamber. The air cooling system is configured to cool the alternator thereby heating the air. The water circuit includes a housing water inlet, a housing water outlet, and a water pump configured to pump water through the water circuit. The housing water inlet is configured to receive water from outside the housing at a first water temperature and the housing water outlet is configured to output water from the housing. The air-to-water heat exchanger includes an ATW exchanger air inlet fluidly coupled to the first chamber and configured to receive air from the first chamber at the second air temperature, an ATW exchanger air outlet fluid coupled to the second chamber and configured to output air to the second chamber at a third air temperature less than second air temperature, an ATW exchanger water inlet fluidly coupled to a first portion of the water circuit and configured to receive water at the first water temperature, and an ATW exchanger water outlet fluidly coupled to a second portion of the water circuit and configured to output water at a second water temperature greater than the first water temperature. The air-to-water heat exchanger is configured to place the air and the water in a heat exchange relationship to heat the water and the cool the air. The coolant-to-water heat exchanger includes a CTW exchanger coolant inlet fluidly coupled to the second portion of the coolant circuit and configured to receive coolant at the second coolant temperature, a CTW exchanger coolant outlet configured to output coolant to a third portion of the coolant circuit at a third coolant temperature less than the second coolant temperature, a CTW exchanger water inlet fluidly coupled to the second portion of the water circuit and configured to receive water at the second water temperature, and a CTW exchanger water outlet fluidly coupled to a third portion of the water circuit and configured to output water at a third water temperature greater than the second water temperature. The coolant-to-water heat exchanger is configured to place the coolant and the water in a heat exchange relationship to heat the water and the cool the coolant. The third portion of the water circuit is fluidly coupled to the housing water outlet. The exhaust-to-coolant heat exchanger includes an ETC exchanger exhaust inlet fluidly coupled to the engine exhaust outlet and configured to receive exhaust from the engine at the first exhaust temperature, an ETC exchanger exhaust outlet configured to output exhaust at a second exhaust temperature less than the first exhaust temperature, an ETC exchanger coolant inlet fluidly coupled to the third portion of the coolant circuit and configured to receive coolant at the third coolant temperature, and an ETC exchanger coolant outlet fluidly coupled the first portion of the coolant circuit and configured to output coolant at a fourth coolant temperature greater than the third coolant temperature. The exhaust-to-coolant heat exchanger is configured to place the exhaust and the coolant in a heat exchange relationship to heat the coolant and cool the exhaust.

Another embodiment of the invention relates to a combined heat and power system including a housing, a coolant circuit, a liquid-cooled internal combustion engine, an air-cooled alternator, a water circuit, an air-to-water heat exchanger, and a coolant-to water heat exchanger. The housing includes a first chamber, a second chamber, and a passageway fluidly coupling the first chamber to the second chamber. The coolant circuit includes a coolant pump configured to pump coolant through the coolant circuit. The liquid-cooled internal combustion engine includes a liquid cooling system configured to cool the engine with coolant from the coolant circuit thereby heating the coolant. The air-cooled alternator is configured to be driven by the internal combustion engine to produce electricity. The alternator includes an air cooling system configured to cool the alternator thereby heating air. The water circuit includes a housing water inlet, a housing water outlet, and a water pump configured to pump water through the water circuit. The housing water inlet is configured to receive water from outside the housing and the housing water outlet is configured to output water from the housing. The air-to-water heat exchanger is configured to place heated air from the first chamber and water from the water circuit in a heat exchange relationship to preheat the water and cool the air. The coolant-to-water heat exchanger is configured to place heated coolant from the liquid cooling system and preheated water from the air-to-water heat exchanger in a heat exchange relationship to further heat the water and cool the coolant. The coolant-to-water heat exchanger is fluidly coupled to the housing water outlet to provide heated water to the housing water outlet.

Another embodiment of the invention relates to a combined heat and power system. The combined heat and power system includes an enclosed unit divided into a plurality of chambers, an internal combustion engine within the enclosed unit, wherein the internal combustion engine is cooled by a coolant, an alternator coupled to the internal combustion engine, wherein the alternator generates electricity for output outside of the enclosed unit, a coolant circulation pump, a working fluid circulation pump, an exhaust-to-coolant heat exchanger, wherein the exhaust-to-coolant heat exchanger receives exhaust gases from the internal combustion engine to heat the coolant, a coolant-to-water heat exchanger, wherein the coolant-to-water heat exchanger utilizes the coolant heated from the exhaust-to-coolant heat exchanger to heat a working fluid provided from a source outside of the enclosed unit, and an air-to-water heat exchanger, wherein the air-to-water heat exchanger heats the working fluid using air circulating within the enclosed unit.

Another embodiment of the invention relates to a method of operating a combined heat and power system. The method includes receiving, by an exhaust-to-coolant heat exchanger, exhaust gases from an internal combustion engine contained within an enclosed unit, wherein the enclosed unit is divided into a plurality of chambers, heating, by the exhaust-to-coolant heat exchanger, a coolant within the enclosed unit, circulating, by a coolant circulation pump, the coolant within the enclosed unit, pumping, by a working fluid circulation pump, a working fluid into the enclosed unit, heating the working fluid using the coolant provided by the exhaust-to-coolant heat exchanger, and heating the working fluid using air circulating within the enclosed unit provided by an air-to-water heat exchanger.

BRIEF DESCRIPTION OF THE FIGURES

This application will become more fully understood from the following detailed description, taken in conjunction with the accompanying figures, wherein the like reference numerals refer to like elements in which.

DETAILED DESCRIPTION

Figure 1:
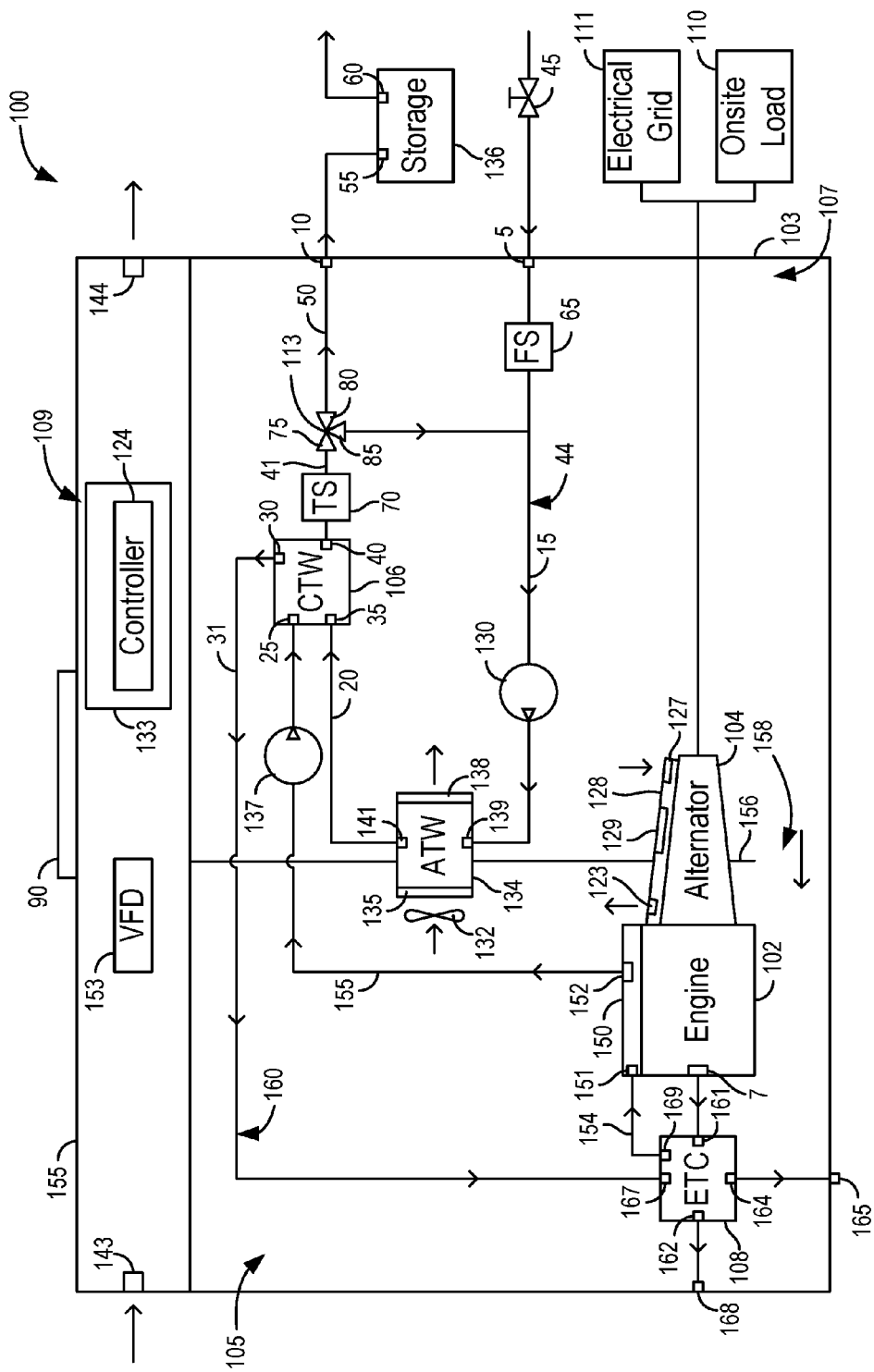
FIG. 1 is a schematic representation of a CHP system, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

CHP systems generate electric power and useful thermal energy from a single fuel source and decrease the amount of energy lost as wasted heat. Conventional CHP systems include an engine that is fueled by a gas (e.g., natural gas) that produces shaft power and waste heat, a water-cooled alternator coupled to the engine that produces usable energy (e.g., electrical), and a thermal collection system that transfers waste heat to a working fluid. Typically, controllers that monitor and control conventional CHP systems are located at a separate location from the CHP unit. While such CHP conventional systems exist, they are not generally designed for precise control of the heated medium (e.g., heated water) and they often overlook opportunities to capture waste heat from areas other than exhaust and water jacket heat from the engine.

The CHP systems described herein may be used as a replacement or supplement for water heaters in many commercial applications including, but not limited to, hotels, restaurants, and multi-family or multi-unit residences. These commercial applications typically have relatively large demands for hot water and use a burner fired by natural gas or another fuel source (e.g., propane) to heat water to provide hot water for various purposes including laundry, faucets, showers, baths, pools, dishwashers, etc. The CHP systems described herein use a similar amount of natural gas as a convention water heater system, but in addition to providing thermal energy for heating the water product electricity for use onsite or to be supplied to the electrical grid. Accordingly, the CHP systems described herein reduce energy costs and increase energy efficiency compared to conventional commercial water heater systems. Additionally, the CHP systems described herein harvest more heat for use as thermal output than conventional CHP systems and reduce energy costs and increase energy efficiency compared to conventional CHP systems. The electricity output of the CHP systems described herein may range from approximately 10 kilowatts (kW) to 50 kW, while the thermal output of the CHP systems herein may range from approximately 20 kW to 100 kW.

Further, conventional CHP systems typically use proportioning valves to add cold water and bleed off hot water, while running the pump in the system at a constant speed. In such a system, the pump would need to be run at a full load continuously, where valves may be more prone to fail through constant use. The CHP systems described herein use variable speed pumps such that the proportioning valves are no longer needed for proper functionality, creating a system with fewer components and fewer opportunities to fail. Additionally, traditional CHP systems utilize water-cooled alternators, wherein the systems described herein use air-cooled alternators. Beneficially, air-cooled alternators may be used to pre-heat working fluid in the system prior to further heating by using the waste heat from the air-cooled alternator. Typically, air-cooled alternators are less expensive than water-cooled alternators. Also, air-cooled alternators require fewer connections than water-cooled alternators and eliminate the potential for water leaks.

The CHP systems described herein may be used to complement the power which is traditionally delivered by the centralized or local power grid. In this regard, the CHP systems herein may be used in connection with a system which monitors electrical loads and intelligently controls whether the electricity produced from the CHP system is used for to power an onsite load or if the electricity produced is sent back to the grid to neutralize any power used previously. Thus, the CHP systems described herein may be used to replace or supplement the power traditionally provided by a power grid.

Referring to FIG. 1, the combined heat and power system 100 includes a housing 103, a coolant circuit 160, a liquid-cooled internal combustion engine 102 including a liquid cooling system 150, an air-cooled alternator 104 including an air cooling system 128, a water circuit 44, an air-to-water heat ("ATW") exchanger 134, a coolant-to-water heat exchanger ("CTW") 106, and an exhaust-to-coolant ("ETC") heat exchanger 108. Electricity produced by the CHP system 100 may be distributed to an onsite load 110 or to the electrical grid 111. Hot water produced by the CHP system 100 may be distributed to a storage tank 136 or directly to an end use location (e.g., faucet, spigot, etc.).

The housing 103 includes a first chamber 105, a second chamber 107, and a third chamber 109. A passageway 158 through a wall 156 separating the first chamber 105 and the second chamber 107 fluidly couples the first chamber 105 to the second chamber 107 to allow air to flow between the two chambers 105 and 107. The housing 103 includes a water inlet 5 through which water from the outside water source 45 enters the housing 103 and a water outlet 10 through which hot water exits the housing 103 to the storage tank 136.

The internal combustion engine 102 combusts a fuel to produce mechanical energy to power the alternator 104 and products of combustion or exhaust. In some embodiments, the engine is a multi-cylinder engine (e.g., one, two, three, four, six, or eight cylinder engine) in which the fuel is combusted in the cylinders, thereby moving pistons to rotate a crankshaft. A power takeoff from the crankshaft may be directly coupled to the alternator 104 or indirectly coupled to the alternator 104 (e.g., by a transmission) to drive the alternator 104. The engine 102 includes an exhaust outlet 7 that outputs the exhaust from engine 102. The exhaust exits the engine at a relatively hot first exhaust temperature.

The coolant circuit 160 includes pipe or conduit that fluidly couples various components of the CHP system 100 together to allow for the flow of coolant between these components. The coolant circuit 160 includes a coolant pump 137 configured to pump coolant through the coolant circuit 160. Each portion of the coolant circuit 160 may include one or more pipes or conduits to allow coolant to flow as described herein.

The engine 102 is at least partially cooled by the liquid cooling system 150, which includes an engine coolant inlet 151 fluidly coupled to a first portion 154 of the coolant circuit 160 and engine coolant outlet 152 fluidly coupled to a second portion 155 of the coolant circuit 160. Within the liquid cooling system 150, the coolant passes over various components of the engine 102 and absorbs heat from the engine 102 thereby cooling the engine 102 and heating the coolant before it exits the liquid cooling system 150. The engine 102 is located within the first chamber 105 of the housing 103.

The air-cooled alternator 104 is driven by the internal combustion engine 102 to produce electricity. The alternator 104 includes a rotor that rotates relative to a stator to produce electricity. The alternator 104 is cooled by the air cooling system 128, which includes an alternator air inlet 127 that receives relatively cool air from the second chamber 107 at a first air temperature and an alternator air outlet 123 that outputs relatively hot air to the first chamber 105 at a second air temperature greater than the first air temperature. The air cooling system 128 includes a fan 129 to move air through the air cooling system 128. The fan 129 may be driven by the rotor of the alternator 104, the crankshaft of the engine 102, or other power supply. Within the air cooling system 128, air moved by the fan 129 passes over various components of the alternator and absorbs heat from the alternator 104 thereby cooling the alternator 104 and heating the air before it exits the alternator air outlet 123.

The water circuit 44 includes pipe or conduit that fluidly couples various components of the CHP system 100 together to allow for the flow of water (or other working fluid) between these components. The water circuit 44 includes a water pump 130 configured to pump water through the water circuit 44. each portion of the water circuit 44 may include one or more pipes or conduits to allow coolant to flow as described herein The air-to-water heat exchanger 134 includes an air inlet 135 fluidly coupled to the first chamber 105, an air outlet 138 fluidly coupled to the second chamber 107, a water inlet 139 fluidly coupled to a first portion 15 of the water circuit 44, and a water outlet 141 fluidly coupled to a second portion 20 of the water circuit 44. The air-to-water heat exchanger 134 places the air and the water in a heat exchange relationship to heat the water and the cool the air. The air-to-water heat exchanger 134 and other heat exchangers 134 may be different types of heat exchangers depending on space, efficiency, cost, and other requirements. Appropriate types of heat exchangers may include, shell and tube heat exchangers, plate heat exchangers, plate and shell heat exchangers, plate fin heat exchangers, and microchannel heat exchangers. These are exemplary embodiments of the heat exchangers described herein and not intended to be limiting.

The coolant-to-water heat exchanger 106 includes a coolant inlet 25 fluidly coupled to the second portion 155 of the coolant circuit 166, a coolant outlet 30 fluidly coupled to a third portion 31 of the coolant circuit 166, a water inlet 35 fluidly coupled to the second portion 20 of the water circuit 44, and a water outlet 40 fluidly coupled to a third portion 41 of the water circuit 44. The coolant-to-water heat exchanger 106 places the coolant and the water in a heat exchange relationship to heat the water and the cool the coolant. The third portion 41 of the water circuit 44 is fluidly coupled to the water outlet 10 via a valve 113 and a fourth portion 50 of the water circuit 44. The water circuit 44 includes one or more temperature sensors 70. As illustrated, temperature sensor 70 is positioned in the third portion 41 of the water circuit to sense the temperature of the water exiting the coolant-to-water heat exchanger 106. Alternatively, the temperature sensor 70 can be included in the coolant-to-water heat exchanger 106 or positioned at/in the water outlet 40 to sense the temperature of the water exiting the coolant-to-water heat exchanger.

The valve 113 includes an input 75 fluidly coupled to the third portion 41 of the water circuit 44, a first outlet 80 fluidly coupled to the housing water outlet 10 via the fourth portion 50 of the water circuit 44, and a second valve outlet 85 fluidly coupled to a fifth portion of the water circuit 44. The valve 113 is operable to output water from either the first outlet 80 or the second outlet 80. The fourth portion 50 of the water circuit 44 is fluidly coupled to the water outlet 10 of the housing 103. From there, the hot water may be put to use at an end use location or stored for later use in the storage tank 136. The storage tank 136 includes an inlet 55 and an outlet 60 to allow for water flow into and out of the tank 136. The fifth portion of the water circuit 44 is fluidly coupled to the first portion 15 of the water circuit 44 to allow water to recirculate through the air-to-water heat exchanger 134 and the coolant-to-water heat exchanger 106 in order to increase the temperature of the water exiting the coolant-to-water heat exchanger 106 (as sensed by temperature sensor 70) to a threshold or target temperature.

A controller or processing circuit 124 is provided to monitor and control operation of the CHP system 100 and its components. A processing circuit can include a processor and memory device. Processor can be implemented as a general purpose processor, an application specific integrated circuit (ASIC), one or more field programmable gate arrays (FPGAs), a group of processing components, or other suitable electronic processing components. Memory device (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. Memory device may be or include volatile memory or non-volatile memory. Memory device may include database components, object code components, script components, or any other type of information structure for supporting the various activities and information structures described in the present application. According to an exemplary embodiment, memory device is communicably connected to processor via processing circuit and includes computer code for executing (e.g., by processing circuit and/or processor) one or more processes described herein. The controller includes inputs and outputs as necessary to communicate with the components of the CHP system 100 and external devices and systems as described herein. The controller may include modules to enable wireless communication (e.g., Wi-Fi cellular, BLUETOOTH, NFC, ZIGBEE, power line communication, etc.) or wired communication.

The controller 124 is configured to operate the valve 113 (e.g., by actuating one or more solenoids) to output water from the first valve outlet 80 when the water temperature of the water exiting the coolant-to-water heat exchanger 106 as sensed by the water temperature sensor 70 is greater than a target water temperature and configured to output water from the second valve outlet 85 when the water temperature of the water exiting the coolant-to-water heat exchanger 106 as sensed by the water temperature sensor 70 is less than the target water temperature to recirculate to increase its temperature to the target water temperature. The target water temperature can be input to the controller 124 by a user input device 90 that is part of or remote from the housing 103. The user input device 90 could be a laptop, phone, computer, or mobile device that communicates with the controller 124 wirelessly or with a wired connection. The user input device 90 could also be a touchscreen, keyboard, mouse or other peripheral device, buttons, switches, dials, or other device suitable for providing a temperature target (set point) or range to the controller 124. In some embodiments, the target water temperature is about 80° C. (about 176 degree Fahrenheit) (e.g., 82° C. (179.6 degree Fahrenheit)).

The controller 124 is also configured to control the variable frequency drive 153 and thereby control the speed of the water pump 130 to vary the flow rate of the water in the water circuit 44. By controlling the flow rate of the water in the water circuit 44, the CHP system is able to control heat transfer to the water. When relatively small amounts of heat energy are available (e.g., during start up of the CHP system 100), the water pump 130 is controlled to produce relatively low water flow rates, thereby increasing the amount of time the water flowing through the air-to-water heat exchanger 134 and the coolant-to-water heat exchanger 106 spends in the heat exchangers and thereby transferring more of the heat energy to the water. As the available heat energy increases, the flow rate of the water can also increase. Available heat energy can be determined by the controller by using temperature sensors to sense the temperature of the air in the first chamber 105, the coolant in the coolant circuit 160, and/or the temperature of the water exiting the coolant-to-water heat exchanger 106. One or more of these temperature inputs can be used by the controller 124 to control the variable frequency drive 153. For example, during startup, the controller 124 use the sensed coolant temperature to control the water flow rate, but once the system is "warmed-up" (as determined by the temperature of the water exiting the coolant-to-water heat exchanger 106 or by determining a steady-state of input water flow with a flow sensor or switch 65 positioned in the first portion 15 of the water circuit 44), the temperature of the water exiting the coolant-to-water heat exchanger 106 may be used to control the water flow rate.

The controller 124 may also be configured to provide a maintenance indicator to alert a user to a need to flush or otherwise clean the water circuit 44. As the CHP system 100 operates, the water circuit 44 and other components through which water flows will develop water scale and other potential clogs that reduce the efficiency of water flow through the CHP system 100. The flow sensor 65 can be configured to detect a steady-state input water flow threshold or set point (e.g., 1.9 gallons (7.192 liters) per minute). The controller 124 can use this water flow rate input to determine when to provide the maintenance indicator by monitoring during shutdown the frequency provided by the variable frequency drive 153 to the water pump 130 when the water flow detected by the flow sensor 65 drops below the threshold ("shutdown frequency"). The controller 124 can then compare the present shutdown frequency with the original (factory, installation, etc.) shutdown frequency of the CHP system 100. As water scale or other obstructions increase in the CHP system 100, the shutdown frequency will also increase from its original value. When the difference between the two meets or exceeds a threshold amount, the controller 124 provides the maintenance indicator to alert the user to service the CHP system 100. The maintenance indicator can be a light, an alarm on a display screen or touch screen, a message pushed to a mobile device, or other appropriate indicator to alert the user to the need to service the CHP system 100.

The exhaust-to-coolant heat exchanger 108 includes an exhaust inlet 161 fluidly coupled to the exhaust outlet 7 of the engine 102, an exhaust outlet 162 fluidly coupled to a housing exhaust outlet 168 in the housing 103 to output engine exhaust outside of the housing 103, a coolant inlet 167 fluidly coupled to the third portion 31 of the coolant circuit 160, and a coolant outlet 169 fluidly coupled to the first portion 154 of the coolant circuit 160. The exhaust-to-coolant heat exchanger 108 places the exhaust and the coolant in a heat exchange relationship to heat the coolant and cool the exhaust. This operation is beneficial to both cool the exhaust and preheat the coolant before it enters the engine 102.

In operation, the engine 102 is started and the alternator 104 begins to produce electricity. Operation of the engine 102 and the alternator 104 produces heat (e.g., via air outlet 123 and elsewhere) that heats the air first chamber 105 to an air temperature greater than the air temperature in the second chamber 107. This air is drawn into the air inlet 135 of the air-to-water heat exchanger 134 by the fan 132 and heats the water flowing through the air-to-water heat exchanger 134 so that water exiting the heat exchanger at water outlet 141 is at a higher temperature than water entering the heat exchanger at water inlet 139. The air exits the air-to-water heat exchanger 134 through the air outlet 138 at a temperature less than the temperature at which it entered the air inlet 135. This air enters the second chamber 107.

Operation of the engine 102 also increases the temperature of the coolant in the liquid cooling system 150. Heated coolant exits the engine coolant outlet 152 and flows to the coolant-to-water heat exchanger 106. As the heated coolant flows through the coolant-to-water heat exchanger 106, heat is transferred to the water flowing through the coolant-to-water heat exchanger 106 so that the temperature of the coolant entering through coolant inlet 25 is greater than the temperature of the coolant exiting through coolant outlet 30 and the temperature of the water entering through water inlet 35 is less than the temperature of the water exiting through water outlet 40. If the temperature of the water exiting through water outlet 40 as sensed by temperature sensor 70 is less than the threshold water temperature, the controller 124 operates the valve 113 so that water flows through valve outlet 85 and is recirculated to the air-to-water heat exchanger 134 and the coolant-to-water heat exchanger 106 for further heating. If the temperature of the water exiting through water outlet 40 as sensed by temperature sensor 70 is greater than the threshold water temperature, the controller 124 operates the valve 113 so that water flows through the valve outlet 80 and is sent to out of the housing 103 to the water storage tank 136 or an end user location.

The coolant exiting the coolant-to-water heat exchanger 106 flows to the exhaust-to-coolant heat exchanger 108. As the coolant flows through the coolant-to-water heat exchanger 106, heat is transferred to the coolant from the exhaust produced by the engine and flowing through the coolant-to-water heat exchanger 106 so that the temperature of the coolant entering the coolant inlet 167 is less than the temperature of the coolant exiting the coolant outlet 162 and the temperature of the exhaust entering the exhaust inlet 161 is greater than the temperature of the exhaust exiting the exhaust outlet 162.

The electricity produced by the alternator 104 may be used to power an onsite load 110. The onsite load 110 can by any electrical demand on the premises at which the CHP system 100 is installed (e.g., building power demands). The electricity produced by the alternator 104 may also be sent to the local electrical grid 111. Providing power to the electrical grid 111 may result to offsets or reductions to the electrical bill for the premises at which the CHP system 100 is installed. The controller 124 can be configured to evaluate whether to use the electricity produced by the alternator 104 to power an onsite load 110 or sent to the electrical grid 111. For example, the controller 124 may be in communication with a source of pricing information for electricity and/or the fuel powering the CHP system 100 and determine whether it is more cost effective to power the current demand from the onsite load 110 or provide electricity to the electrical grid 111. The controller 124 can also be configured to monitor and evaluate onsite electrical usage based on historical records, expected weather or outside temperatures, etc. to determine whether to power the current demand from the onsite load 110 or provide electricity to the electrical grid 111.

Referring now to FIG. 1, a CHP system 100 is illustrated according to an exemplary embodiment. CHP system 100 is a single, enclosed unit including a housing 103 divided into three chambers, a first chamber 105, a second chamber 107, and a third chamber 109. CHP system 100 produces electricity to be distributed and used outside of the CHP system 100. Unlike conventional CHP systems that house the heat exchangers and electronics in a separate location from the engine and alternator, the CHP system 100 disclosed herein houses the engine, alternator, heat exchangers, and electronics as the single, enclosed unit within the housing 103, thereby requiring fewer field connections of the components of the CHP system 100 than conventional CHP systems. Additionally, the CHP system 100 uses heat produced within the CHP system 100 and applies it to heating water or another working fluid (e.g., coolant, refrigerant, etc.) flowing within the CHP system 100 more effectively and efficiently than conventional CHP systems. The CHP system 100 thereby produces more useable energy in the form of electricity and heated water and decreases the amount of wasted heat produced relative to conventional CHP systems. Furthermore, the flowing water within the CHP system 100 is monitored, such that heated water that reaches a desired temperature is removed from the CHP system 100 and more water from an outside source is brought into the CHP system to be heated. Therefore, energy is not wasted on heating water above the desired temperature as done by conventional CHP systems. In other embodiments, the housing 103 may include less than or more than three chambers. For example, the housing 103 may be divided into four chambers.

Referring to FIG. 1, the housing 103 includes an outer enclosure (e.g., top, bottom, and side walls), a chamber wall 156 that separates the first chamber 105 and the second chamber 107, and a chamber wall 157 that separates the third chamber 109 from the first chamber 105 and the second chamber 107. As illustrated, the chamber wall 156 extends from the chamber wall 157 toward the bottom wall of the outer enclosure of the housing 103 opposite from the third chamber 109. The chamber wall 156 includes an opening, or as illustrated does not contact the bottom wall to provide a passageway or conduit 158 between the first chamber 105 and the second chamber 107 so that the first chamber 105 and the second chamber 107 are fluidly coupled together to allow air to pass between the two chambers via the passageway 158. The chamber wall 156 includes an opening that an alternator 104 extends through such that an alternator intake or inlet 127 of the alternator air cooling system 128 is located in the second chamber 107 and an alternator exhaust or outlet 123 is of the alternator air cooling system 128 located in the first chamber 105. The alternator cooling system 128 includes a fan or blower 129 to draw air in through the inlet 127, cause the air to pass over various surfaces and components of the alternator 104 to cool the alternator 104, thereby heating the air, and then output the heated air from the outlet 123.

The CHP system 100 additionally includes an air-to-water ("ATW") heat exchanger 134. In some embodiments, the air-to-water heat exchanger 134 is attached to the chamber wall 156. In other embodiments, the air-to-water heat exchanger 134 is housed within the chamber wall 156. In other embodiments, the air-to-water heat exchanger 134 is mounted to the chamber wall 156 such that the entire air-to-water heat exchanger 134 is located in the first chamber 105, located in the entire second chamber 107, or partially located in both the first chamber 105 and the second chamber 107.

The air-to-water heat exchanger 134 includes an air inlet 135 fluidly coupled to the first chamber 105, an air outlet 138 fluidly coupled to the second chamber 107, a water inlet 139 fluidly coupled to a first portion of a water circuit or loop 44, and a water outlet 141 fluidly coupled to a second portion of the water circuit 44. The air-to-water heat exchanger 134 places air and water in a heat exchange relationship to heat the water and thereby cool the air. A fan 132 draws relatively hot air at a first air temperature (e.g., about 60° C. (about 140 degree Fahrenheit)) into the air-to-water heat exchanger 134 through the air inlet 135. After heating the water passing through the air-to-water heat exchanger 134 via the water inlet 139 and the water outlet 141, the cooled air is output from the air-to-water heat exchanger 134 through the air outlet 138 to the second chamber 107 at a second air temperature less than first air temperature. The passageway 158 permits the flowing of air between the second chamber 107 and the first chamber 105, specifically air flows from the second chamber 107 and returns to the first chamber 105. Higher temperature air from the first chamber 105 is cooled by the air-to-water heat exchanger 134 before it passes into the second chamber 107. The passageway 158 balances the interior pressures of both the first chamber 105 and the second chamber 107 by allowing air not passed through the alternator air cooling system 128 to freely flow between the chambers of the housing 103, specifically from the second chamber 107 to the first chamber 105. The lower temperature air from the second chamber 107 that returns to the first chamber 105 assists with cooling the first chamber 105, including components within the first chamber 105, such as an engine or other prime mover 102 (e.g., a turbine) and an exhaust-to-coolant ("ETC") heat exchanger 108. In some embodiments, during normal operation of the CHP system 100, the air temperature in the first chamber 105 is about 60° C. (about 140 degree Fahrenheit) and the air temperature in the second chamber 107 is about 40° C. (about 104 degree Fahrenheit). The CHP system 100 takes advantage of this temperature differential by locating components that may be sensitive to higher temperatures (e.g., the various pumps, valves, and sensors described in more detail herein) in the second chamber 107. In contrast, in conventional CHP systems without a housing divided into chambers, the entire interior of the housing may equalize at a temperature of about 50° C. (about 122 degree Fahrenheit) and expose components that may be sensitive to higher temperatures to an air temperature above that of the CHP system 100.

Referring to FIG. 1, the first chamber 105 houses the prime mover 102, the alternator air outlet 123, and the exhaust-to-coolant heat exchanger 108. In some embodiments, the air-to-water heat exchanger 134 and/or the fan 132 are fully or partially located within the first chamber 105. In some embodiments, the first chamber 105 has the highest air temperature within the housing 103 during normal operation of the CHP system 100. As the operational period (run time) of the engine 102 and the alternator 104 becomes longer, the air temperature within the first chamber 105 increases due to heat produced by operation of the engine 102 and the alternator 104.

The engine 102 is an internal combustion engine that may be fueled by natural gas, propane, or other fuel. The engine 102 is coupled to the alternator 104 to drive the alternator 104 to produce electricity to meet an onsite electrical load 110 or for transmission to the electrical grid 111. The engine 102 rotates the alternator 104, which generates electrical power to be distributed and used outside of the CHP system 100. In some embodiments, the CHP system 100 may use a turbine as the prime mover and may be fueled by a variety of fuels, such as diesel, gasoline, kerosene, liquefied petroleum, biomass, etc. CHP systems in some embodiments may also be fueled by more than one fuel source. For example, the CHP system 100 may be fueled by both natural gas and biomass.

Referring to FIG. 1, the second chamber 107 houses the alternator air inlet 127, a coolant-to-water ("CTW") heat exchanger 106, a two-way valve 113, a water pump 130 and a coolant pump 137. In some embodiments, the air-to-water heat exchanger 134 and/or the fan 132 are fully or partially enclosed within the second chamber 107. In some embodiments during normal operation of the CHP system 100, the air temperature in the second chamber 107 is greater than the air temperature in the third chamber 109 and less than the air temperature in the first chamber 105.

Referring to FIG. 1, the third chamber 109 includes an electronic panel 133 that includes one or more controllers, processors, memories, CPUs, modules, or other components to control operation of the CHP system 100, is components, and interactions between the CHP system 100 and outside components or devices (e.g., storage tank 136, electrical grid 111, water source 45, etc.). The third chamber 109 is a vented space located within the housing 103. The third chamber 109 includes an air inlet or vent 143 and an air outlet or vent 144 formed in the outer enclosure of the housing 103. The vents 143 and 144 permit the passage of air from outside the housing 103 through the third chamber 109 to providing a cooler environment for the electronic panel 133. The electronic panel 133 monitors the operation of the CHP system 100. In some embodiments, the electronic panel 133 may be located outside of the housing 103. In these embodiments, the third chamber 109 may be omitted from the housing 103.

The engine 102 includes a liquid cooling system 150 for cooling the engine 102. The liquid cooling system 150 is in fluid communication with a coolant circuit or loop 160 via engine coolant inlet 151 and an engine coolant outlet 152. Coolant or heat transfer fluid (e.g., liquid coolant) is circulated through the coolant circuit 160 by coolant pump 137. In some embodiments, the coolant is glycol or is a solution including glycol. During operation of the CHP system 100, the coolant absorbs heat produced in the first chamber. In some embodiments, the coolant also flows through the coolant loop 160 during non-operational periods of engine 102 and the alternator 104 to aid in heat dissipation (e.g., the coolant pump 137 runs for some amount of time following engine shutdown). The coolant is heated by the heat being emitted from the engine 102 when the coolant flows through and around the engine 102. The coolant may additionally be heated by heated air exiting the alternator air outlet 123 and the ambient air in the first chamber 105. Alternative embodiments may use a gas coolant or a coolant that changes phases between gas and liquid (e.g., a refrigerant).

Figure 2:
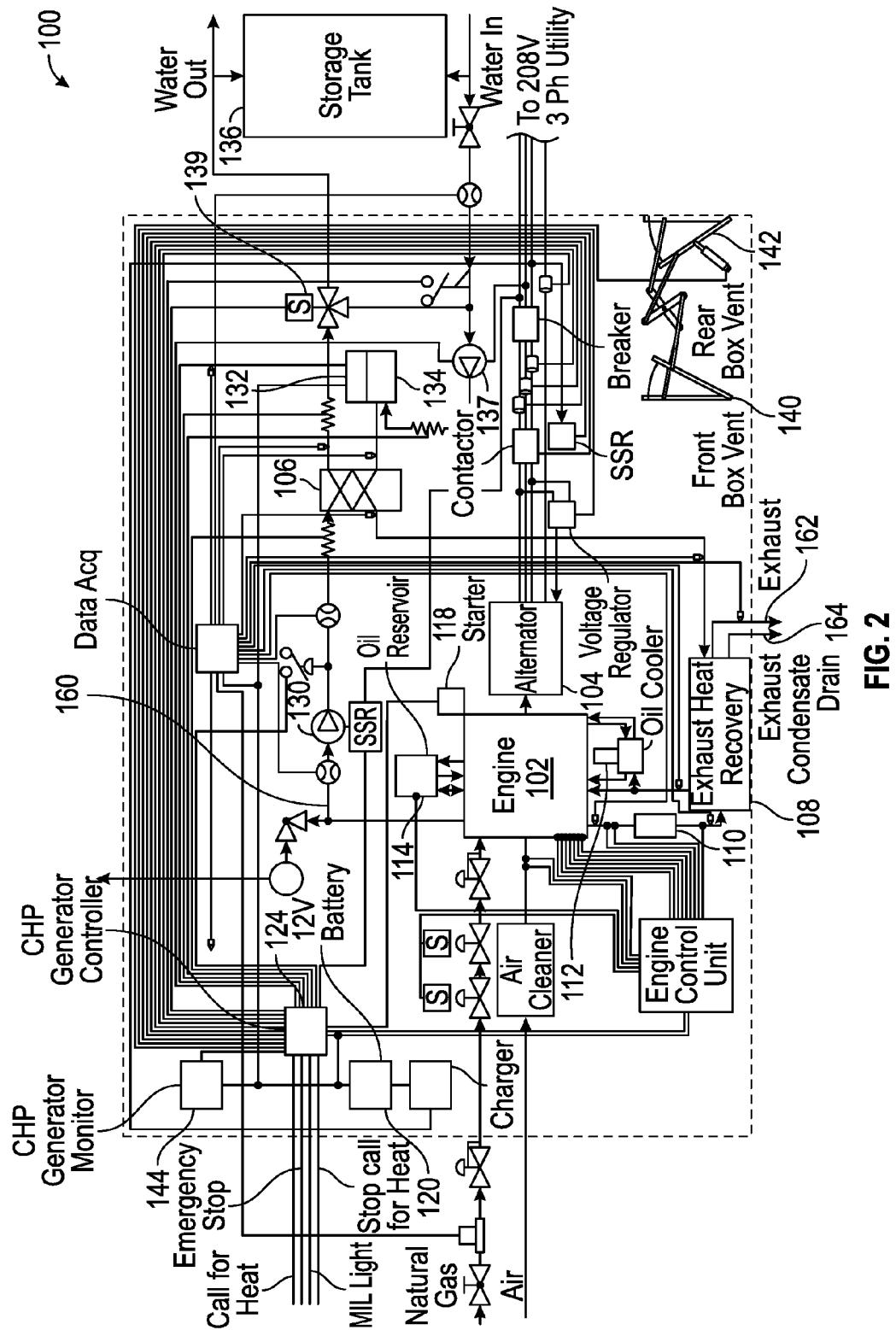
FIG. 2 is a schematic representation of the CHP system of FIG. 1, according to an exemplary embodiment.

Referring to FIG. 2, the engine 102 may also be cooled and lubricated via oil circulated through an oil cooler 112, which cools the oil to maintain suitable oil temperatures to prevent damage of the engine 102. Waste heat from the oil cooler 112 contributes to the relatively high air temperature in the first chamber 105. Upon receiving a signal to start the engine 102 from a CHP generator controller 124, which may be a component or module of electrical panel 133, a starter motor 118 (powered by a 12V battery 120) acts to start the engine 102. In turn, the engine 102 drives the alternator 104 as described above to generate electrical power to be delivered for powering electrical loads outside of the CHP system 100.

The coolant pump 137 pumps the heated liquid coolant from the first chamber 105 to the coolant-to-water heat exchanger 106 located in the second chamber 107. The coolant flows through the coolant-to-water heat exchanger 106 and heats up water or another working fluid that flows simultaneously through the coolant-to-water heat exchanger 106. The water that enters the CHP system 100 is generally potable water or process water. The coolant exits the coolant-to-water heat exchanger 106 and flows toward the exhaust-to-coolant heat exchanger 108. The temperature of the coolant is higher when the liquid coolant enters the coolant-to-water heat exchanger 106 compared to when the liquid coolant exits the coolant-to-water heat exchanger 106. The water absorbs heat from the heated liquid coolant and conversely, the liquid coolant loses heat as it flows through the coolant-to-water heat exchanger 106. In some embodiments, the coolant-to-water heat exchanger 106 may be located in a different location within the housing 103. In some embodiments, the water and the coolant may enter the coolant-to-water heat exchanger 106 and remain in the coolant-to-water heat exchanger 106 for a period of time until the coolant and the water reach a desired temperature and then exit the coolant-to-water heat exchanger 106 instead of the working fluid and the coolant constantly flowing through the coolant-to-water heat exchanger 106.

The coolant entering the exhaust-to-coolant heat exchanger 108 flows through and absorbs heat from the exhaust gases produced by the engine 102 during combustion of the fuel. The coolant exits the exhaust-to-coolant heat exchanger 108 and continues to flow through and around the prime mover 102, continuously absorbing heat. The coolant loop 160 directs the flow of the coolant from the prime mover 102, to the coolant-to-water heat exchanger 106, then to the exhaust-to-coolant heat exchanger 108, and back to the engine 102. As shown, an exhaust condensate drain 164 and an exhaust outlet or port 162 provide outlets for exhaust condensate and exhaust, respectively, to exit the exhaust-to-coolant heat exchanger 108. The condensate and exhaust may directly exit the housing 103 via the exhaust condensate drain 164 and the exhaust outlet 162, or the exhaust condensate drain 164 may be fluidly coupled to a condensate outlet 165 in the housing 103 and the exhaust outlet 162 may be fluidly coupled to a housing exhaust outlet 168 in the housing 103.

The second chamber 107 includes the water loop 44 that extends from a water source 45 located outside of the housing 103, around the second chamber 107 and to either a storage tank 136 or to an outside source to be distribute hot water to end use locations (e.g., faucet, spigot, valve, dishwasher, laundry, etc.). The water entering the housing 103 is relatively cool in temperature and may be drawn from a municipal or other potable water supply. The cool water flows from the outside source 45 and absorbs heat from the heated interior of the first chamber 105 by flowing through the air-to-water heat exchanger 134. The fan 132 rapidly rotates and directs the heated air from the interior of the first chamber 105 and into the air-to-water heat exchanger 134 to heat the water flowing through the air-to-water heat exchanger 134. The temperature of the water entering the air-to-water heat exchanger 134 is less than the temperature of the water exiting the air-to-water heat exchanger 134. The water flowing through the air-to-water heat exchanger 134 is constantly absorbing heat from the air passing through the air-to-water heat exchanger 134. The CHP system 100 is able to take heat produced during operational and non-operational periods within the housing 103 and gathered by the air within the housing 103 and use the hot air to increase the temperature of the water. The CHP system 100 is able to take generated heat from the prime mover 102 in the housing 103 and use the heat in a manner in which heat loss is minimized, thereby making the CHP system 100 more energy efficient than conventional CHP systems. Conventional CHP systems typically use water-cooled alternators and insulate the engine and alternator to dissipate waste heat from these two components. In contrast, the CHP system 100 makes use of what would otherwise be waste heat produced by the engine 102, the alternator 104, and other components of the CHP system 100 (e.g., the oil cooler 112) to heat the air in the first chamber 105 and uses this hot air to heat water in the air-to-water heat exchanger 134. Conventional CHP systems do not include an air-to-water heat exchanger of this type and are unable to make use of this thermal energy that is otherwise lost as waste heat.

The flow of heated water exiting the air-to-water heat exchanger 134 that flows to the coolant-to-water heat exchanger 106 is controlled by the water pump 130. The water absorbs heat from the coolant that is flowing through the coolant-to-water heat exchanger 106. The water may remain in the coolant-to-water heat exchanger 106 until the water reaches the desired temperature. The temperature of the heated water exiting the coolant-to-water heat exchanger 106 is higher than the temperature of the water entering the coolant-to-water heat exchanger 106. Once the heated water reaches a user specified temperature within the range of approximately 60° C. (approximately 140 degree Fahrenheit) to 85° C. (185 degree Fahrenheit), the heated water exits the housing 103 and either flows to the storage tank 136 or is distributed to outside sources as usable hot water. As the temperature of the coolant increases, the flow rate of water flowing through the CHP system 100 increases thereby maximizing the amount (volume) of water that can be heated to the user specified temperature by the available thermal energy in the coolant. The water is able to absorb heat from the coolant at the increased flow rate and exit the CHP system 100 in a shorter period of time. In alternative embodiments, the coolant-to-water heat exchanger 106 may have both the coolant and the water flowing simultaneously. For example, the coolant and the water are continuously flowing through the coolant-to-water heat exchanger 106 without being kept in any portion of coolant-to-water heat exchanger 106 for a longer period of time and the water exits the coolant-to-water heat exchanger 106 without regard to water temperature.

In some embodiments, the water entering the housing 103 is monitored and pumped in by the water pump 130 using alternating current. A variable frequency drive 153 located in the third chamber 109 with the electronic panel 133 controls the water pump 130 located in the second chamber 107. The variable frequency drive 153 applies different frequencies to the water pump 130 in the range of approximately 10 Hz-60 Hz to vary the flow rate of the water through the CHP system 100. Increasing the frequency the variable frequency drive 153 applies to the water pump 130 will increase the flow rate of the water entering the housing 103. Lowering the frequency the variable frequency drive 153 applies to the water pump 130 will decrease the flow rate of the water entering the housing 103. In alternative embodiments, variable water flow rate control may be achieved in various ways. For example, the current applied to the water pump 130 may be controlled by using a thyristor circuit for alternating current, the voltage applied to the water pump 130 may be controlled, or a direct current pump, may be controlled by pulse width modulation to get similar results as using the variable frequency drive. Also, water flow out of the house 103 may be controlled in the manner of conventional CHP systems by utilizing a fixed speed pump and a feedback loop or a mechanically/electrically actuated restrictor or bleed valve. However, this conventional approach requires continuous operation of the fixed speed pump which results in increased pump wear and decreased pump life relative to the variable speed pump of the CHP system 100.

Components or modules of the electronic panel 133 control and monitors the operation of the CHP system 100. The electronic panel 133 includes a CHP generator controller 124 that monitors various aspects of the CHP system 100. The CHP system 100 relies on a plurality of temperature and pressure sensor readings provided to the CHP generator controller 124 to manage operation of the system, and particularly to assure proper water temperatures exiting the system 100. In some embodiments, importantly, water is not allowed to exit the system 100 until it reaches a suitable temperature for the desired application (e.g., 79° C. (174.2 degree Fahrenheit) in commercial potable water applications). Using temperature sensors the temperature of the working fluid in the water loop and the temperature of the coolant in the coolant loop 160, as well as storage tank 136 temperatures, are monitored. The CHP generator controller 124 also monitors an electronic system that includes controlling and monitoring operational sequencing breakers, contactors, transducers, voltage regulators, etc.

The CHP system 100 may electronically shut-off if the electronic panel 133 senses the temperature within the housing 103 exceeds a desired interior operational temperature. The two-way valve may be in an open state position or a closed state position. In some embodiments, during operational periods of the CHP system 100, the two-way valve is in the open state position. The positioning of the two-way valve is controlled by the electronic panel 133. For example, if the working fluid reaches the desired temperature within the CHP system 100, then the electronic panel 133 electronically signals for the two-way valve to open allowing the working fluid to pass through the two-way valve 113 toward the storage tank 136 or another outside source to be used as heated water.

The electronic panel 133 controls the variable frequency drive that determines the rate at which the coolant pump 137 brings the working fluid into the CHP system 100. The electronic panel 133 monitors additional aspects of the CHP system 100 to maintain operation of the CHP system 100 within a safe and functional environment. Various sensors (e.g. temperature, pressure, flow, etc.) may be included in the CHP system to detect operating conditions of various components of the CHP system. For example, temperature sensors may be used to sense air temperatures in all or some of the first chamber 105, the second chamber 107, the third chamber 109, and the ambient air temperature outside of the housing 103. Pressure sensors may be used in the coolant circuit 160 or the water circuit 44 to sense pressure or pressure differentials. Flow sensors may be used in the coolant circuit 160 or the water circuit 44 to sense flow rates. If the electronic panel 133 of CHP system 100 senses any aspect of the CHP system 100, temperature, pressure, etc. via the appropriate sensor that is outside of a defined operational range (e.g., above a threshold, below a threshold, etc.), then the electronic panel 133 may electronically shut down the operation of the CHP system 100. In some embodiments, the electronic panel 133 may be located separate from the housing 103. For example, the electronic panel 133 may be located in different areas in the same room, in different rooms, or even in different buildings from the housing 103. In some embodiments, the electronic panel 133 may also monitor the temperature within the interiors of the first chamber 105, the second chamber 107, and the third chamber 109 using temperature sensors located within the housing 103. In alternative embodiments, the electronic panel 133 may also monitor the interior pressures of the first chamber 105, the second chamber 107, and the third chamber 109 within the housing 103 via pressure sensors. The CHP system 100 may electronically shut-off if the electronic panel 133 senses the interior pressure of the housing 103 exceeds a desired interior operational pressure threshold.

Referring to FIG. 2, the CHP system 100 further includes a front vent 140 and rear vent 142 in the housing 103, which are louvered to open and close and provide cool outside air into the housing 103. In some embodiments, when the CHP system 100 is shut down, vents 140, 142, are controlled via the CHP generator controller 124 to open. Vents 140, 142 are in fluid communication the first chamber 105 and the second chamber 107 so that fan 132 or another fan or fans can blow warm air out of the housing 103 via the vents 140, 142. This helps to cool the engine 102, the coolant loop 160, and the water loop 44 to more quickly and bring the temperatures of the system 100 to a desired level after shut down, then if the vents 140, 142 were not provided. Vents 140, 142 may also provide a source of supply air to the interior of the housing 103.

As discussed above, the fan 132 not only provides warm air across the air-to-water heat exchanger 134 to pre-heat the working fluid, but also acts to force air out of the enclosure 103 when vents 140, 142 are open. Additionally, fan 129 is configured to force the relatively cold air of the second chamber 107 over the alternator 104 during operation, which provides for higher alternator efficiencies, longer alternator life, etc.

Figure 3:
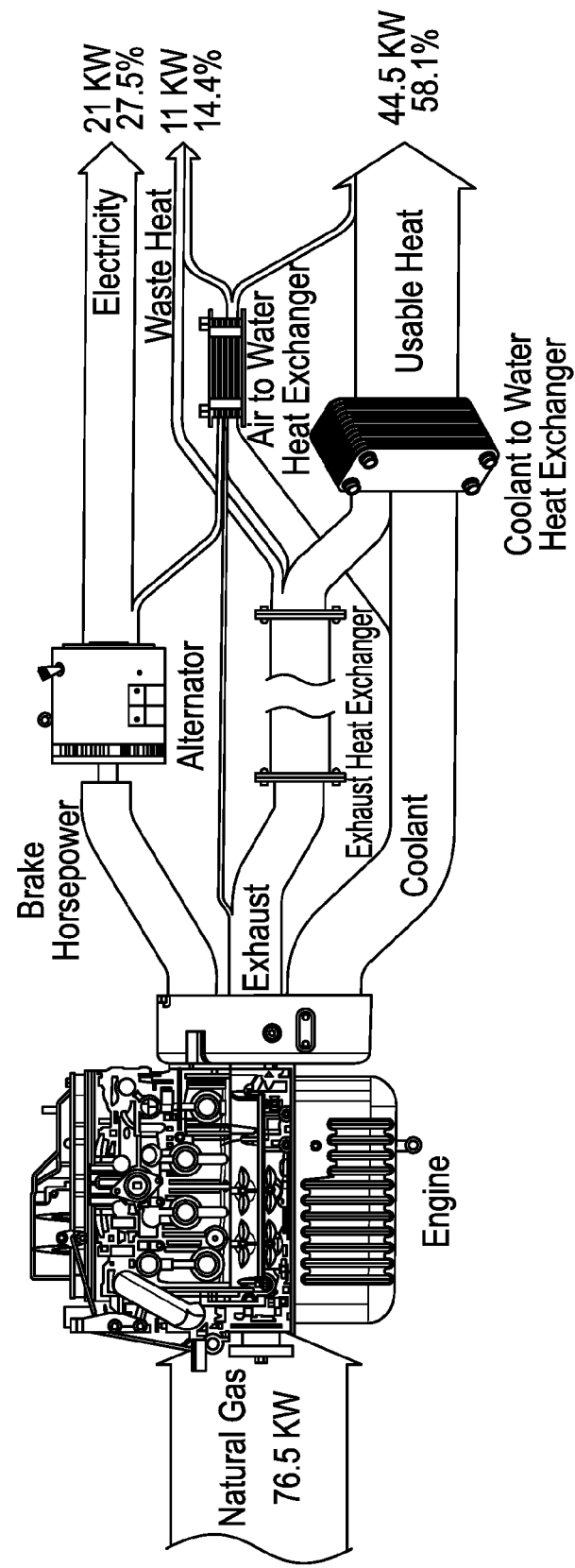
FIG. 3 is an energy balance diagram for the CHP system of FIG. 2, according to an exemplary embodiment.

Referring now to FIG. 3, an energy balance diagram of the CHP system 100 is shown, according to an exemplary embodiment. As shown in this example, an engine 102 or other prime mover is powered by a fuel (e.g., natural gas). The engine 102 is capable of producing approximately 76.5 kilowatts (kW) of total energy, which is divided between mechanical energy (brake horsepower) provided to the alternator 104, exhaust heat produced by the products of combustion from the engine's combustion of the fuel provided to the exhaust-to-coolant heat exchanger 108, and convective heat generated by operation of the engine 102 provided to the coolant-to-water exchanger 106 via coolant. The air-to-water heat exchanger 134 uses what would otherwise be waste heat from within the housing 103 and turns it into usable heat by using the relatively hot air to heat water in the air-to-water heat exchanger 134. The alternator 104 is capable of providing approximately 21 kW of usable electricity, while the combination of heat drawn from the engine exhaust, the engine coolant system, and the air within the housing is capable of providing approximately 44.5 kW of usable hot water, whereas only about 11 kW of the energy input is lost as waste heat. Thus, in accordance with this example, the CHP system 100 is capable of about 85.6% efficiency. It is to be understood that these amounts and percentages are not limiting and may vary based on equipment, operating conditions, etc.

Figure 4:
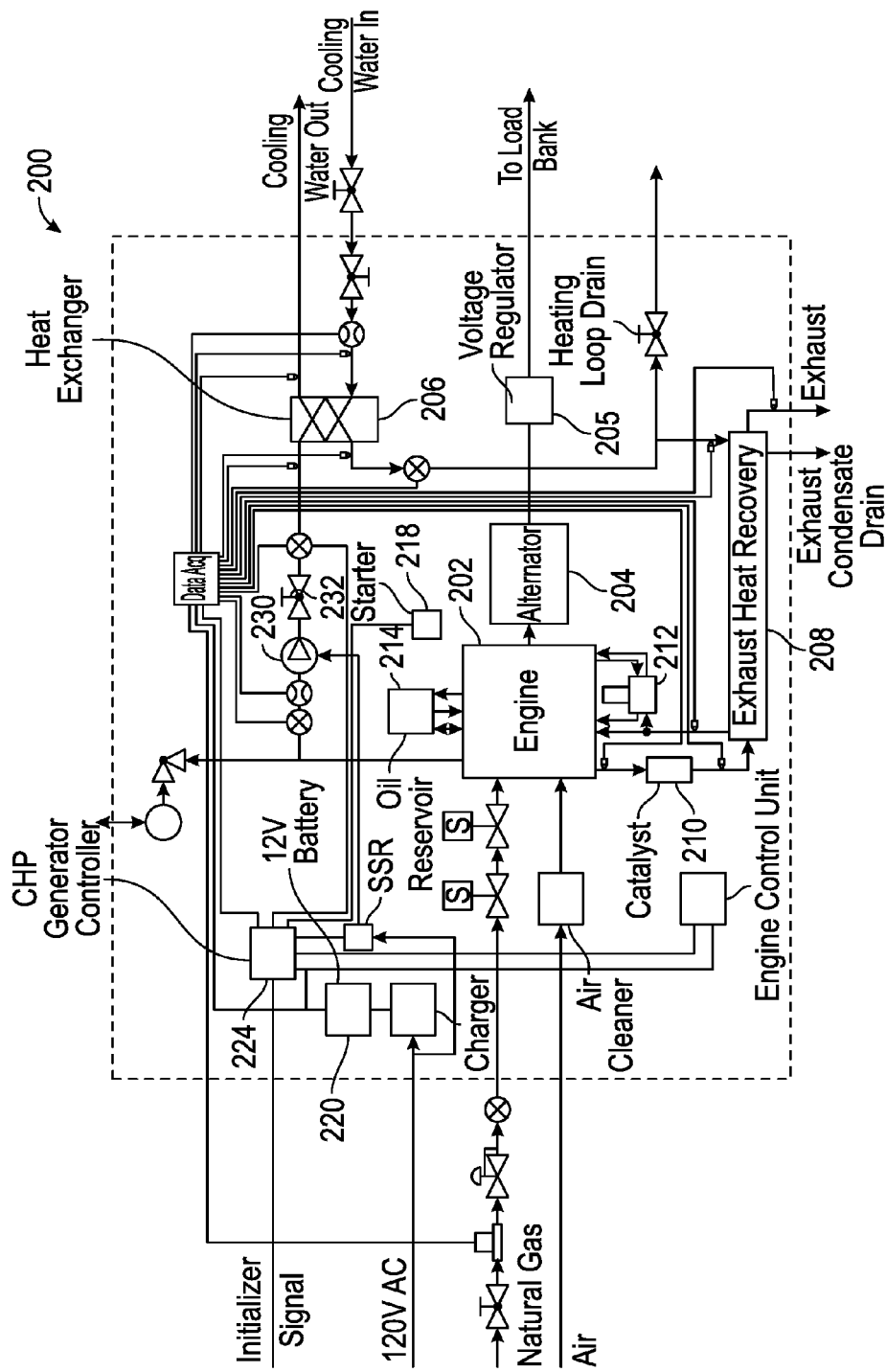
FIG. 4 is a schematic representation of a CHP system, according to an exemplary embodiment.

Referring now to FIG. 4, a CHP system 200 is shown in schematic form in accordance with an exemplary embodiment. The schematic illustration of CHP system 200 is similar to that of CHP system 100 discussed above with respect to FIG. 2. CHP system 200 includes a prime mover 202 (e.g., an internal combustion engine). Prime mover 202 runs on gaseous fuels, including, but not limited to, natural gas, diesel gasoline, kerosene, liquefied petroleum gas, etc. Prime mover 202 is cooled and lubricated via oil delivered from an oil reservoir 214, wherein the oil is also circulated through an oil cooler 212, helping to maintain suitable oil temperatures to prevent damage of prime mover 202. Upon receiving a signal to start prime mover 202 from a CHP generator controller 224, a starter motor 218 (powered by a 12V battery 220) acts to start the prime mover 202. In turn, the prime mover 202 powers an alternator 204, which generates electrical power to be delivered via a voltage regulator 205 to utility mains. In this way, CHP system 200 converts mechanical energy from prime mover 202 into electrical energy for use in power electrical loads outside of the CHP system 200.

To maintain proper operating temperatures of prime mover 202 within the enclosure of CHP system 200, prime mover 202 is liquid-cooled via a coolant loop. The coolant flows through and around the prime mover 202, absorbing heat generated by the prime mover 202 so as to maintain suitable operating temperatures. In turn, this heated coolant is pumped from prime mover 202 via a coolant loop pump 230 to a single phase, coolant-to-water heat exchanger 206 within the CHP system 200. The coolant-to-water heat exchanger 206 also receives a working fluid (e.g., potable cold inlet water) from outside the CHP system 200, wherein the fluid is heated as it passes through the coolant-to-water heat exchanger 206 and leaves the CHP system 200 as a usable heated fluid.

The coolant that exits the coolant-to-water heat exchanger 206 is then delivered to an exhaust-to-coolant heat exchanger 208. The exhaust-to-coolant heat exchanger 208 receives hot exhaust gases generated by prime mover 202 via a catalyst 210. These hot exhaust gases pass across the liquid coolant, lowering the temperature of the exhaust gases while increasing the temperature of the liquid coolant. The cooled exhaust gases then exit the CHP system 200, while the heated coolant is delivered back to the prime mover 202. In this way, normally wasted exhaust gases are used as a supplement heat source for the coolant, such that the coolant reaches high temperatures more quickly and thus, more efficiently provides a heat source for the working fluid in the coolant-to-water heat exchanger 206.

Figure 5:
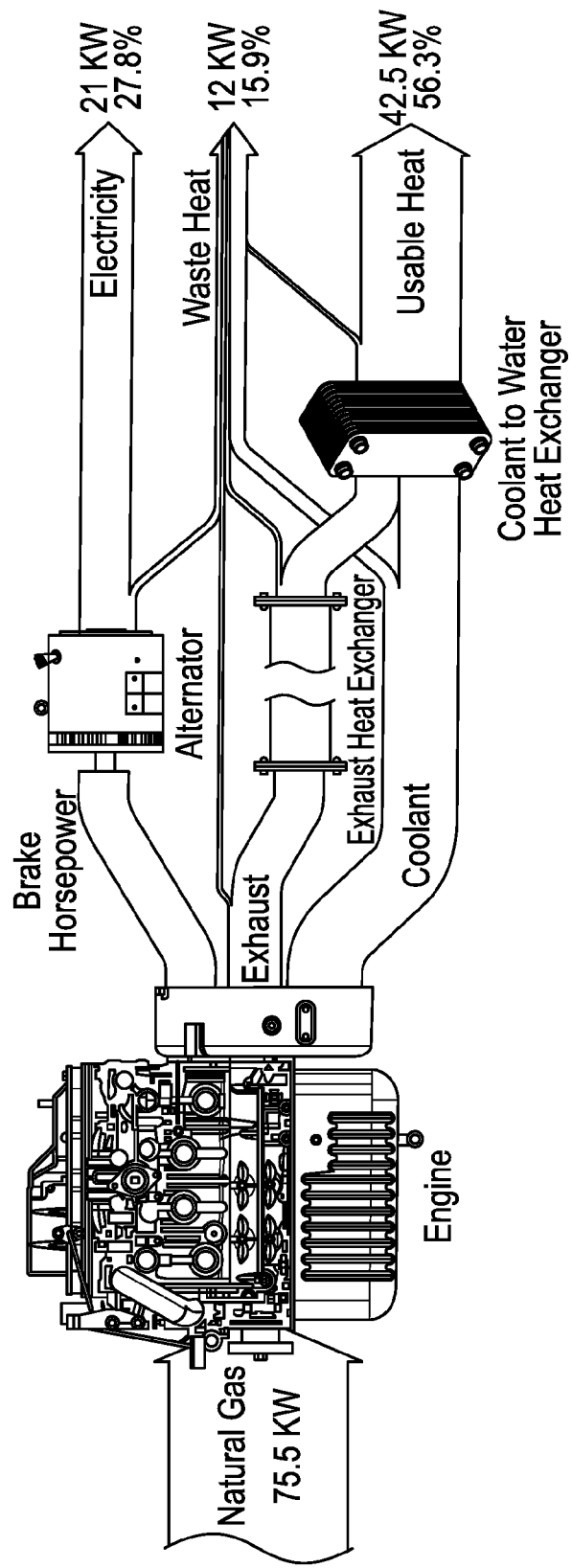
FIG. 5 is an energy balance diagram for the CHP system of FIG. 4, according to an exemplary embodiment.

Referring to FIG. 5, an energy balance diagram of the CHP system 200 is shown, according to an exemplary embodiment. As shown in this example, an engine (e.g., prime mover 202) is fueled by natural gas. The engine is capable of producing approximately 75.5 kW of total energy, which is divided between mechanical (brake horsepower) energy provided to an alternator, exhaust heat provided to an exhaust heat exchanger, and convective heat provided to a coolant-to-water heat exchanger via coolant liquid. The alternator is capable of providing approximately 21 kW of usable electricity, while the combination of the exhaust heat and convective coolant heat is capable of providing approximately 42.5 kW of usable heated water, whereas only about 12 kW of energy is lost as waste heat. Thus, in accordance with this example, the CHP system 200 illustrated is capable of approximately 84.1% efficiency. Again, it is to be understood that these amounts and percentages are not limiting and may vary based on equipment, operating conditions, etc.

Figure 6:
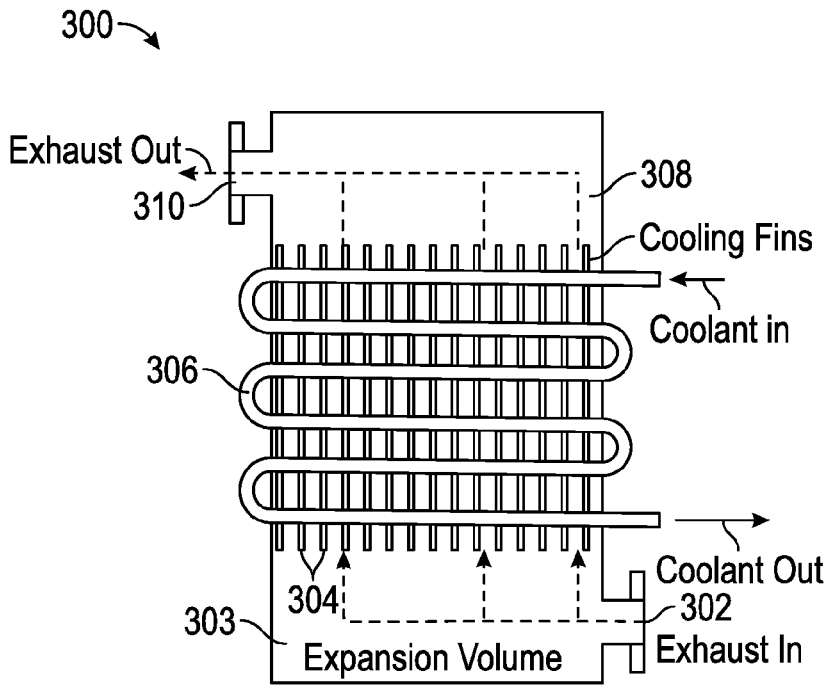
FIG. 6 is a sectional view of a combined exhaust heat exchanger and muffler for a CHP system, in accordance with an exemplary embodiment.

Next, referring to FIG. 6, another exemplary embodiment is shown. As discussed above with respect to both FIG. 2 and FIG. 4, an exhaust heat exchanger may be used to heat the coolant in the system via captured exhaust heat from the engine. However, in addition to simply being a device used for heat exchange, exhaust heat exchanger 300 shown in FIG. 6 may also operate as a muffler to quiet the exhaust of the CHP systems engine. Exhaust heat exchanger/muffler 300 has an exhaust inlet port 302, which enters into an expansion volume 303, which in some embodiments, is sized to be approximately three times the size of the exhaust inlet port 302. From expansion volume 303, exhaust gases must make a 90 degree turn to pass through a plurality of cooling fins 304, which are interleaved with a serpentine coolant tube 306 such that hot exhaust air passing by cooling fins 304 acts to warm the coolant passing through coolant tube 306. The exhaust air then enters a second expansion volume 308, where it must make another 90 degree turn to exit the exhaust outlet 310. Through this "S"-shaped path that the exhaust gases must take, greater sound attenuation is achieved due to pressure pulse cancelling brought on by the series of 90 degree turns that are required for the exhaust to reach the outlet 310, thus providing improved muffler performance.

Figure 7:
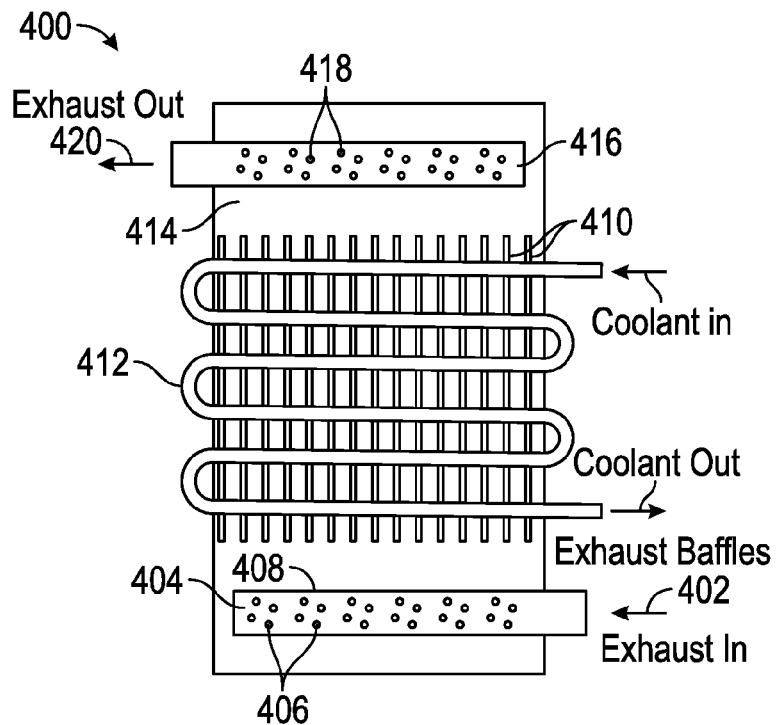
FIG. 7 is a sectional view of a combined exhaust heat exchanger and muffler for a CHP system, in accordance with an exemplary embodiment.

FIG. 7 illustrates another exemplary embodiment of a combination exhaust heat exchanger/muffler 400. Exhaust enters an exhaust inlet 402 into an exhaust inlet baffle 404, where it must exit a plurality of perforated holes 406 into an expansion chamber 408. The exhaust gases then pass through a plurality of cooling fins 410 and past a coolant tube 412. The exhaust gases then enter a second expansion chamber 414, wherein the gases must enter an exhaust outlet baffle 416 through a plurality of perforated holes 418 and exit the exhaust heat exchanger/muffler 400 through an exhaust outlet 420.

While FIG. 6 and FIG. 7 show two specific combination exhaust heat exchanger/muffle designs, it is to be understood that other forms of heat exchangers are also contemplated. As an example, the coolant tube may be brazed on to the outer muffler wall, the coolant tube may be fully captured within the muffler walls, the muffler may include a condensate trap/drain, etc.

Figure 8:
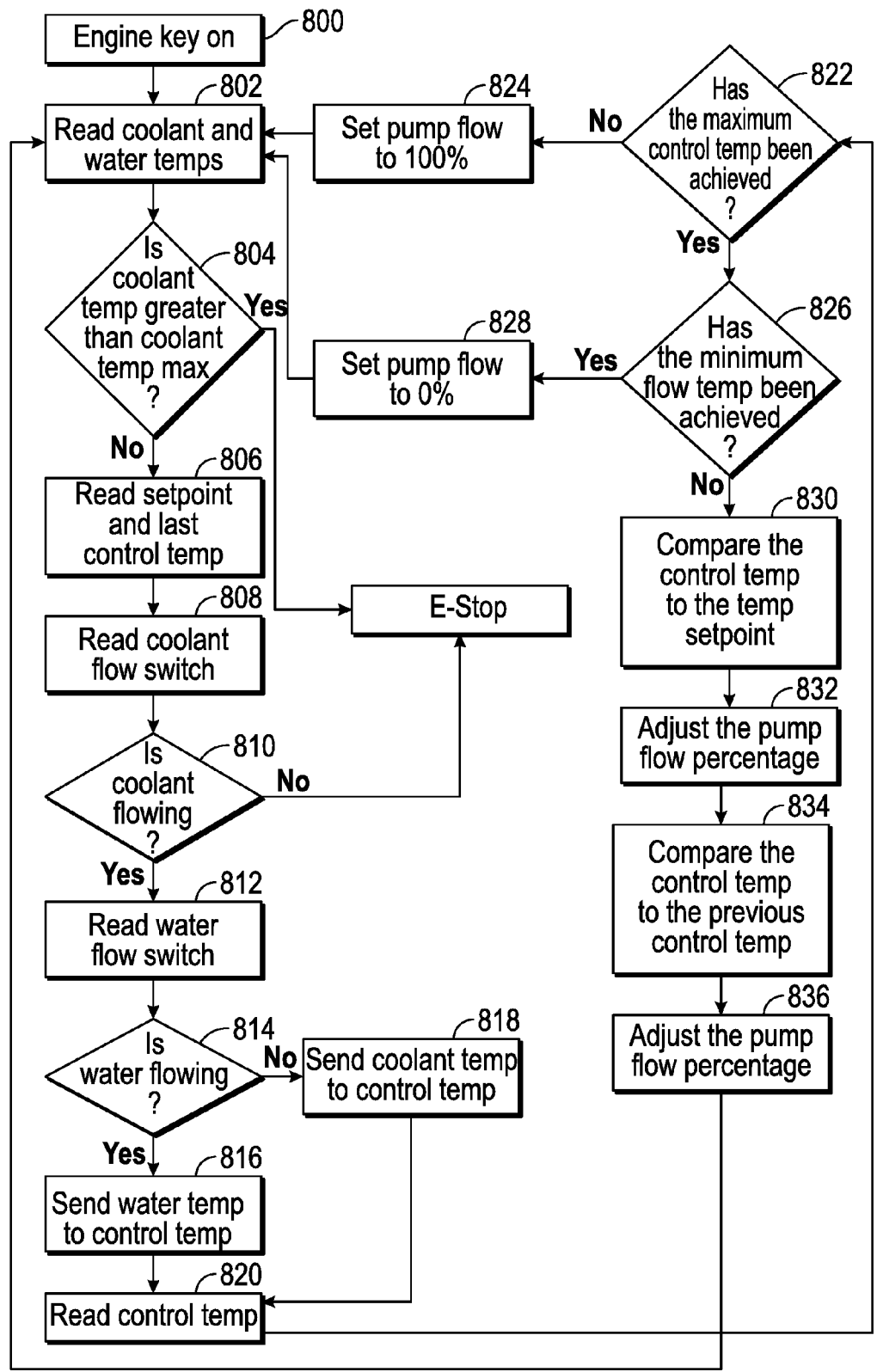
FIG. 8 is a flow diagram of monitoring and regulating working fluid flowing through the CHP system according to an exemplary embodiment.

Referring to FIG. 8, a flow chart for the CHP system is shown according to the exemplary embodiment. Process 800 requires turning on the prime mover (e.g., engine) to start the CHP system. At process 802, the CHP system reads a working fluid temperature (e.g., water) and a coolant temperature to determine a first output. In alternative embodiments, the CHP system at process 802 may only determine a second output by reading the working fluid temperature and not determining a third output of the coolant temperature. In alternative embodiments, the CHP system at process 802 may only determine the third output by reading the coolant temperature and not determining the second output of the working fluid temperature. At process 804, the CHP system determines if the coolant temperature is greater than the coolant temperature maximum. If the coolant temperature is greater than the coolant temperature maximum, then the CHP system is electronically shut-off. If the coolant temperature is less than the coolant temperature maximum, then the CHP system continues operating. At process 806, the CHP system reads the set point temperature and the most recent control temperature when the coolant temperature is below the coolant temperature maximum. At process 808, the CHP system reads a coolant flow switch. At process 810, the CHP system determines if the coolant is flowing through the CHP system. If the coolant stops flowing through the CHP system, then the CHP system electronically shuts off. If the coolant continues flowing within the operational temperature range, then the CHP system continues operating. At process 812, the CHP system reads a water flow switch when coolant is flowing through the CHP system. At process 814, the CHP system determines if the working fluid is flowing through the CHP system. At process 816, the water temperature is sent to control temperature when the CHP system determines that the working fluid is flowing within the CHP system. At process 818, the coolant temperature is sent to control temperature when the CHP system determines that the working fluid is not flowing within the CHP system. At process 820, the CHP system reads the control temperature after the coolant temperature or the water temperature is sent to the control temperature. At process 822, the CHP system determines if the maximum control temperature is achieved. At process 824, the working fluid circulation pump is set to flow to 100% if the maximum control temperature is not achieved and then the coolant and water temperatures are monitored once again beginning at process 802. At process 826, the CHP system determines if the minimum flow temperature is achieved after the CHP system determines that the maximum control temperature is achieved. At process 828, the working fluid circulation pump is set to flow to 0% if the minimum flow temperature is achieved and then the coolant and water temperatures are monitored once again beginning at process 802. At process 830, the control temperature is compared to the set point temperature when the CHP system does not achieve the minimum flow temperature. At process 832, the working fluid circulation pump percentage is adjusted. At process 834, the control temperature is compared to the previous control temperature reading. At process 836, the working fluid circulation pump percentage is adjusted and the process continues again at process 802, reading the coolant and water temperatures within the CHP system.

Further modifications and alternative embodiments of various aspects of the invention will be apparent to those skilled in the art in view of this description. Accordingly, this description is to be construed as illustrative only. The construction and arrangements, shown in various exemplary embodiments, are illustrative only. Other substitutions, modifications, changes and omissions may also be made in the design, operating conditions and arrangement of the various exemplary embodiments without departing from the scope of the present invention.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

References herein to the positions of elements (e.g., "top," "bottom," "above," "below," "upper," "lower," etc.) are merely used to describe the orientation of various elements as illustrated in the Figures. It should be noted that the orientation of various elements may differ according to other exemplary embodiments, and that such variations are intended to be encompassed by the present disclosure.

What is claimed is:

1. A combined heat and power system comprising:
    a housing including a first chamber, a second chamber, and a passageway fluidly coupling the first chamber to the second chamber;
    a coolant circuit including a coolant pump configured to pump coolant through the coolant circuit;
    a liquid-cooled internal combustion engine including an exhaust outlet configured to output exhaust at a first exhaust temperature and a liquid cooling system with an engine coolant inlet configured to receive coolant at a first coolant temperature from a first portion of the coolant circuit and an engine coolant outlet configured to output coolant at a second coolant temperature greater than the first coolant temperature to a second portion of the coolant circuit, wherein the engine is located in the first chamber, and wherein the liquid cooling system is configured to cool the engine thereby heating the coolant;
    an air-cooled alternator configured to be driven by the internal combustion engine to produce electricity, the alternator including an air cooling system with an alternator air inlet configured to receive air from the second chamber at a first air temperature and an alternator air outlet configured to output air at a second air temperature greater than the first air temperature to the first chamber, wherein the air cooling system is configured to cool the alternator thereby heating the air;
    a water circuit including a housing water inlet, a housing water outlet, and a water pump configured to pump water through the water circuit, wherein the housing water inlet is configured to receive water from outside the housing at a first water temperature and the housing water outlet is configured to output water from the housing;
    an air-to-water heat exchanger, comprising:
        an ATW exchanger air inlet fluidly coupled to the first chamber and configured to receive air from the first chamber at the second air temperature;
        an ATW exchanger air outlet fluid coupled to the second chamber and configured to output air to the second chamber at a third air temperature less than second air temperature;
        an ATW exchanger water inlet fluidly coupled to a first portion of the water circuit and configured to receive water at the first water temperature; and
        an ATW exchanger water outlet fluidly coupled to a second portion of the water circuit and configured to output water at a second water temperature greater than the first water temperature;
        wherein the air-to-water heat exchanger is configured to place the air and the water in a heat exchange relationship to heat the water and the cool the air;
    a coolant-to-water heat exchanger, comprising:
        a CTW exchanger coolant inlet fluidly coupled to the second portion of the coolant circuit and configured to receive coolant at the second coolant temperature;

a CTW exchanger coolant outlet configured to output coolant to a third portion of the coolant circuit at a third coolant temperature less than the second coolant temperature;

a CTW exchanger water inlet fluidly coupled to the second portion of the water circuit and configured to receive water at the second water temperature; and a CTW exchanger water outlet fluidly coupled to a third portion of the water circuit and configured to output water at a third water temperature greater than the second water temperature;

wherein the coolant-to-water heat exchanger is configured to place the coolant and the water in a heat exchange relationship to heat the water and the cool the coolant; and wherein the third portion of the water circuit is fluidly coupled to the housing water outlet; and an exhaust-to-coolant heat exchanger, comprising:

an ETC exchanger exhaust inlet fluidly coupled to the engine exhaust outlet and configured to receive exhaust from the engine at the first exhaust temperature;

an ETC exchanger exhaust outlet configured to output exhaust at a second exhaust temperature less than the first exhaust temperature;

an ETC exchanger coolant inlet fluidly coupled to the third portion of the coolant circuit and configured to receive coolant at the third coolant temperature; and an ETC exchanger coolant outlet fluidly coupled the first portion of the coolant circuit and configured to output coolant at a fourth coolant temperature greater than the third coolant temperature;

wherein the exhaust-to-coolant heat exchanger is configured to place the exhaust and the coolant in a heat exchange relationship to heat the coolant and cool the exhaust.

2. The combined heat and power system of claim 1, further comprising:

a valve including a valve input fluidly coupled to the third portion of the water circuit, a first valve outlet fluidly coupled to the housing water outlet, and a second valve outlet fluidly coupled to a fourth portion of the water circuit, wherein the valve is operable to output water from either the first valve outlet or the second valve outlet, wherein the fourth portion of the water circuit is fluidly coupled to the first portion of the water circuit:

a water temperature sensor configured to sense the third water temperature;

a controller configured to operate the valve to output water from the first valve outlet when the third water temperature as sensed by the water temperature sensor is greater than a target water temperature and configured to output water from the second valve outlet when the third water temperature as sensed by the water temperature sensor is less than the target water temperature.

3. The combined heat and power system of claim 2, further comprising:

a variable frequency drive configured to drive the water pump at varying pump speeds;

wherein the controller is further configured to control the variable frequency drive to vary the pump speed of the water pump in response to the third water temperature sensed by the water temperature sensor.

4. The combined heat and power system of claim 1, further comprising:

a variable frequency drive configured to drive the water pump at varying pump speeds;

a water flow sensor configured to sense a water flow rate in the water circuit;

a controller configured to provide a maintenance indicator when the pump speed when the water flow rate sensed by the water flow sensor is below a threshold flow rate exceeds a threshold amount.

5. The combined heat and power system of claim 1, wherein the alternator air outlet and the exhaust-to-coolant heat exchanger are located in the first chamber.

6. The combined heat and power system of claim 5, wherein the coolant-to-water heat exchanger, the coolant pump, the water pump, and alternator air inlet are located in the second chamber.

7. The combined heat and power system of claim 1, further comprising:

a controller configured to control operation of the coolant pump and the water pump;

wherein the housing further includes a third chamber and the controller is located in the third chamber.

8. The combined heat and power system of claim 7, further comprising:

a venting system configured to permit outside air to pass through the third chamber.

9. The combined heat and power system of claim 1, further comprising:

a chamber wall that divides the first chamber from the second chamber, wherein the passageway is formed through the chamber wall to allow air to pass between the first chamber and the second chamber.

10. The combined heat and power system of claim 9, wherein the air-to-water heat exchanger is attached to the chamber wall.

11. The combined heat and power system of claim 1, wherein the exhaust-to-coolant heat exchanger is further configured to operate as a muffler.

12. The combined heat and power system of claim 11, wherein the exhaust-to-coolant heat exchanger further comprises an expansion volume at least three times the size of the ETC exchanger exhaust inlet.

13. The combined heat and power system of claim 12, wherein exhaust is configured to enter the exhaust-to-coolant heat exchanger via the ETC exchanger exhaust inlet in a first direction, travel a second direction different than the first direction within the exhaust-to-coolant heat exchanger, and exit the exhaust-to-coolant heat exchanger via the ETC exchanger exhaust outlet in a third direction substantially the same as the first direction.

14. A combined heat and power system comprising:

a housing including a first chamber, a second chamber, and a passageway fluidly coupling the first chamber to the second chamber;

a coolant circuit including a coolant pump configured to pump coolant through the coolant circuit;

a liquid-cooled internal combustion engine including a liquid cooling system configured to cool the engine with coolant from the coolant circuit thereby heating the coolant;

an air-cooled alternator configured to be driven by the internal combustion engine to produce electricity, the alternator including an air cooling system configured to cool the alternator thereby heating air;

a water circuit including a housing water inlet, a housing water outlet, and a water pump configured to pump water through the water circuit, wherein the housing water inlet is configured to receive water from outside the housing and the housing water outlet is configured to output water from the housing;

an air-to-water heat exchanger configured to place heated air from the first chamber and water from the water circuit in a heat exchange relationship to preheat the water and cool the air;

a coolant-to-water heat exchanger configured to place heated coolant from the liquid cooling system and preheated water from the air-to-water heat exchanger in a heat exchange relationship to further heat the water and cool the coolant, wherein the coolant-to-water heat exchanger is fluidly coupled to the housing water outlet to provide heated water to the housing water outlet.

15. The combined heat and power system of claim 14, further comprising:

an exhaust-to-coolant heat exchanger configured to place exhaust from the engine and coolant from the coolant-to-water heat exchanger in a heat exchange relationship to heat the coolant and cool the exhaust.

16. The combined heat and power system of claim 14, further comprising:

a temperature sensor configured to sense a temperature of the heated water from the coolant-to-water heat exchanger;

a valve including a valve input fluidly coupled to the coolant-to-water heat exchanger to receive heated water, a recirculation outlet fluidly coupled to the air-to-water heat exchanger to recirculate heated water to the air-to-water heat exchanger, a hot water outlet fluidly coupled to the housing water outlet to provide heated water to the housing water outlet, wherein the valve is operable to output water from either the recirculation outlet or the hot water outlet; and a controller configured to operate the valve to output water from the hot water outlet when the temperature sensed by water temperature sensor is greater than a target temperature and configured to output water from recirculation outlet when the temperature sensed by the water temperature sensor is less than the target temperature.

17. The combined heat and power system of claim 14, further comprising:

a variable frequency drive configured to drive the water pump at varying pump speeds.

18. The combined heat and power system of claim 17, further comprising:

a water flow sensor configured to sense a water flow rate in the water circuit;

a controller configured to provide a maintenance indicator when the pump speed when the water flow rate sensed by the water flow sensor is below a threshold flow rate exceeds a threshold amount.

19. The combined heat and power system of claim 14, further comprising:

a controller configured to control operation of the coolant pump and the water pump;

wherein the housing further includes a third chamber and the controller is located in the third chamber.

20. The combined heat and power system of claim 19, further comprising:

a venting system configured to permit outside air to pass through the third chamber.

* * * * *